(12) United States Patent
Shimamoto et al.

(10) Patent No.: US 7,591,341 B2
(45) Date of Patent: Sep. 22, 2009

(54) NOISE REDUCTION ELECTRIC POWER STEERING APPARATUS

(75) Inventors: Yuuji Shimamoto, Kashihara (JP); Keizo Arita, Yamatokoriyama (JP); Kouji Kitahata, Osaka (JP); Naoki Uchida, Takaishi (JP)

(73) Assignee: JTEKT Corporation, Osaka (JP)

( * ) Notice: Subject to any disclaimer, the term of this patent is extended or adjusted under 35 U.S.C. 154(b) by 242 days.

(21) Appl. No.: 11/656,494

(22) Filed: Jan. 23, 2007

(65) Prior Publication Data

US 2007/0193820 A1 Aug. 23, 2007

(30) Foreign Application Priority Data

Jan. 24, 2006 (JP) .............................. 2006-015175

(51) Int. Cl.
*B62D 5/04* (2006.01)
(52) U.S. Cl. .................................................... 180/444
(58) Field of Classification Search ................. 180/444, 180/443

See application file for complete search history.

(56) References Cited

U.S. PATENT DOCUMENTS

| 4,950,213 | A | | 8/1990 | Morisawa | |
|---|---|---|---|---|---|
| 6,644,431 | B2 | * | 11/2003 | Kuze et al. | 180/444 |
| 6,851,509 | B2 | * | 2/2005 | Hayakawa et al. | 180/444 |
| 7,357,216 | B2 | * | 4/2008 | Ishii et al. | 180/444 |
| 2004/0094353 | A1 | * | 5/2004 | Shimizu et al. | 180/444 |
| 2005/0077101 | A1 | * | 4/2005 | Yamamoto et al. | 180/444 |
| 2006/0060414 | A1 | * | 3/2006 | Kuroumaru et al. | 180/444 |
| 2007/0102228 | A1 | * | 5/2007 | Shiina et al. | 180/444 |

FOREIGN PATENT DOCUMENTS

| GB | 2 006 348 A | 5/1979 |
|---|---|---|
| JP | 10-110800 A | 4/1998 |
| JP | 2005-263989 A | 9/2005 |

* cited by examiner

*Primary Examiner*—Tony H. Winner
(74) *Attorney, Agent, or Firm*—Birch, Stewart, Kolasch & Birch, LLP

(57) ABSTRACT

An electric power steering apparatus is provided with a worm which is a driving gear interlocked with an electric motor for assisting steering, and a worm wheel which is a driven gear having an annular teeth body made of synthetic resin meshing with the worm and a metallic core body coupling the annular teeth body and is attached to the steering shaft. Protrusions are provided on a side surface of the annular teeth body in a face width direction at a plurality of circumferential positions from which a distance to a center of rotation is different from each other, and stirred lubricating fats and oils applied around the worm wheel. As a result, the lubricating fats and oils can be moved to between tooth surfaces of a meshing portion between the worm and worm wheel.

14 Claims, 4 Drawing Sheets

NOISE REDUCTION ELECTRIC POWER STEERING APPARATUS

CROSS-REFERENCE TO RELATED APPLICATIONS

This Nonprovisional application claims priority under 35 U.S.C. §119(a) on Patent Application No. 2006-015175 filed in Japan on Jan. 24, 2006, the entire contents of which are hereby incorporated by reference.

BACKGROUND OF THE INVENTION

1. Field of the Invention

The present invention relates to an electric power steering apparatus using an electric motor as a power source for assisting steering power.

2. Description of Related Art

An electric power steering apparatus for a vehicle, for example, detects a steering torque applied to an input shaft by a relative angular displacement quantity between the input shaft connected with a steering wheel and an output shaft coaxially connected with the input shaft via a torsion bar, and drives an electric motor for assisting steering based on the detected torque. Then, by transmitting a rotating force of the electric motor to steering means via a pair of gears, an operation of the steering means in accordance with rotation of the steering wheel is assisted by rotation of the electric motor to reduce a burden of labor of a driver for steering.

In a case where a pair of gears is used as described above, due to an occurrence of backlash in a meshing portion of the pair of gears, reduction of meshing noise caused by the backlash must be sought.

As means for reducing meshing noise caused by the backlash, generally providing an adjustment mechanism for adjusting a distance between centers of rotation of a pair of gears, or enhancing dimensional accuracy of gear teeth of the pair of gears have conventionally been attempted. However, since such means make a structure more complicated and lower working efficiency of machining and assembly, remedial measures have been demanded.

To reduce meshing noise caused by the backlash, for example, using lubricating fats and oils having an elastic function has been proposed (see, for example, Japanese Patent Application Laid-Open No. 2005-263989). According to this prior art, direct contact of tooth surfaces of the meshing portion is prevented by applying lubricating fats and oils to a pair of gears and causing the lubricating fats and oils to be present between tooth surfaces.

Incidentally, to reduce meshing noise using lubricating fats and oils, the lubricating fats and oils must always be present between tooth surfaces in the meshing portion. Thus, fluidity must be improved by increasing a consistency value of the lubricating fats and oils to increase lubricity of the lubricating fats and oils. However, since lubricating fats and oils tend to adhere to inner surfaces of a housing where a pair of gears are housed and supported as fluidity of the lubricating fats and oils increases, a problem that a quantity of lubricating fats and oils circulating with rotation of the pair of gears decrease may occur.

BRIEF SUMMARY OF THE INVENTION

The present invention has been devised in consideration of the above circumstances and a main object thereof is to provide an electric power steering apparatus capable of increasing a circulating quantity of the lubricating fats and oils with rotation of the driving gear and the driven gear.

A first aspect of an electric power steering apparatus according to the present invention is an electric power steering apparatus that assists steering by transmitting a rotating force of an electric motor for assisting steering to a steering mechanism via a driving gear and a driven gear meshing with the driving gear, and is characterized in that at least one of the driving gear and the driven gear has at least one protrusion on a side surface in a face width direction.

A second aspect of an electric power steering apparatus according to the present invention is, in the first aspect, is characterized in that a plurality of the protrusions are provided, and each of which is arranged in each of a plurality of circumferential positions of the driving gear or the driven gear with a different distance from a center of rotation of the driving gear or the driven gear from each other.

A third aspect of an electric power steering apparatus according to the present invention is, in the first or second aspect, characterized in that each of the protrusions has guide surfaces that are inclined toward the circumferential direction between an inner side and an outer side in a diameter direction of the driving gear or the driven gear, and guide lubricating fats and oils toward a tooth tip.

A fourth aspect of an electric power steering apparatus according to the present invention is, in the third aspect, characterized in that the guide surfaces on both sides of each of the protrusions are more separated on the inner side than the outer side in the diameter direction of the driving gear or the driven gear on both sides in the circumferential direction of the driving gear or the driven gear.

A fifth aspect of an electric power steering apparatus according to the present invention is, in any one of the first through fifth aspects, characterized in that the driven gear has an annular teeth body made of a synthetic resin and a metallic core body coupled with an inner side of the annular teeth body, and the Protrusions is welded on to the annular teeth body or integrally molded with the annular teeth body.

According to the first aspect of the present invention, when the lubricating fats and oils applied to the driving gear and the driven gear housed and supported by a static member such as the housing adhere to an inner surface of the static member with rotation of the driving gear and driven gear, the applied lubricating fats and oils can be stirred by the protrusion. Therefore, the lubricating fats and oils can be made to adhere to at least one of the driving gear and driven gear repeatedly by the stirring.

According to the second aspect of the present invention, since the distance between the center of rotation and each of a plurality of the protrusions at a plurality of circumferential positions is different from each other, the lubricating fats and oils can be stirred successively at the plurality of positions from which the distance to the center of rotation is different from each other. Therefore, by this stirring, the lubricating fats and oils can be made to adhere to at least one of the driving gear and driven gear repeatedly in short periods.

According to the third aspect of the present invention, since the guide surfaces are provided on each protrusion to guide the lubricating fats and oils toward a tooth tip due to inclination thereof toward a circumferential direction between an inner side and an outer side in a diameter direction of the driving gear and the driven gear, the lubricating fats and oils are stirred successively at a plurality of positions from which the distance to the center of rotation is different from each other. Therefore, the lubricating fats and oils can smoothly be moved to a tooth side along the guide surfaces of protrusions.

According to the fourth aspect of the present invention, each protrusion has guide surfaces forming an approximate Δ shape on both sides of a gear in the circumferential direction whose outer side in the diameter direction of the gear is narrower. Therefore, when steering in a left direction, the lubricating fats and oils can smoothly be moved to the tooth side along one of the guide surfaces of protrusions. Conversely, when steering in a right direction, the lubricating fats and oils can smoothly be moved to the tooth side along the other of the guide surfaces of protrusions.

According to the fifth aspect of the present invention, a plurality of protrusions can still easily be constructed by welding them onto the annular teeth body made of synthetic resin or integrally molding them with the annular teeth body made of synthetic resin.

The above and further objects and features of the invention will more fully be apparent from the following detailed description with accompanying drawings.

DETAILED DESCRIPTION OF THE PRESENT INVENTION

The present invention will be described below in detail based on drawings showing embodiments thereof.

Figure 1:
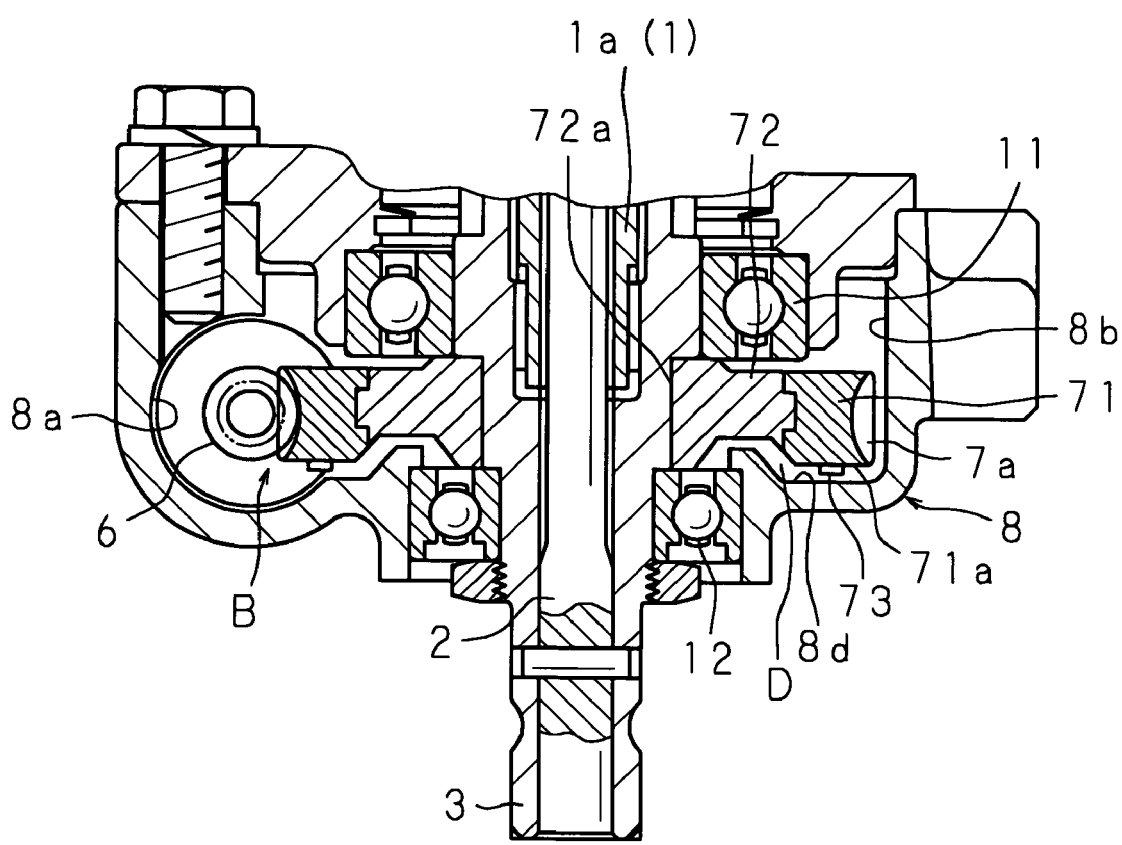
FIG. 1 is an enlarged sectional view showing a configuration of an essential portion of an electric power steering apparatus according to the present invention.
Figure 2:
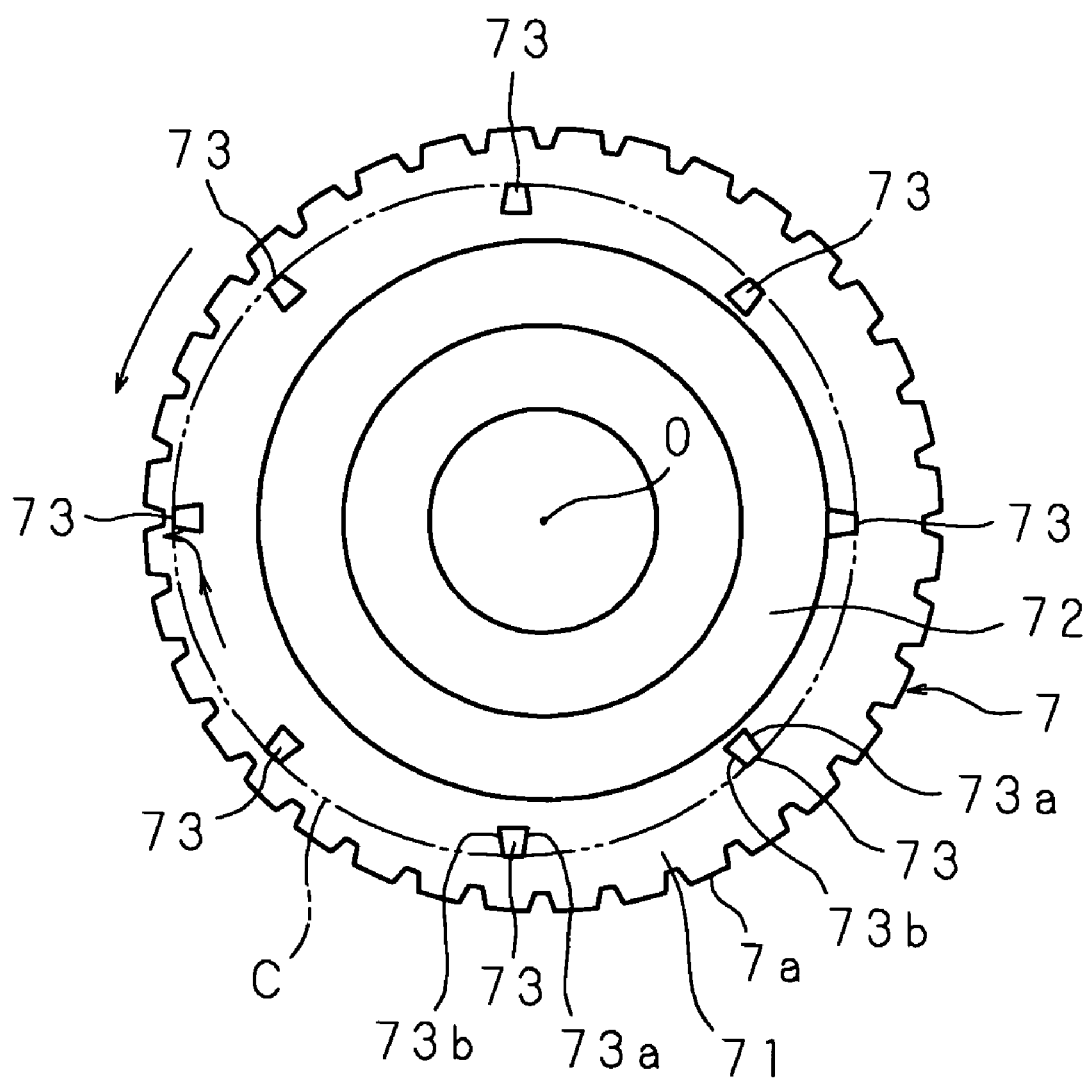
FIG. 2 is a front view showing a configuration of a worm wheel of the electric power steering apparatus according to the present invention.
Figure 3:
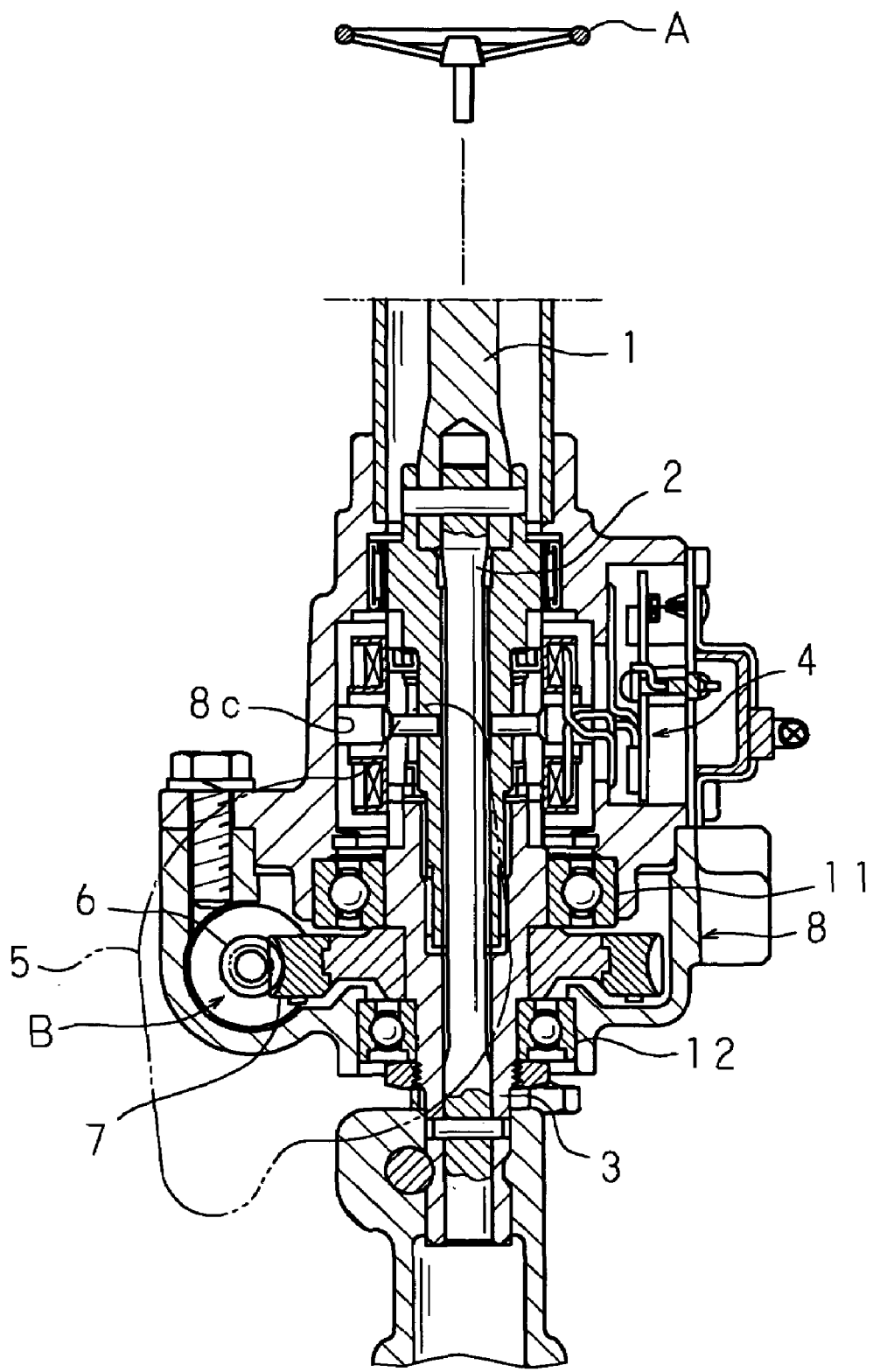
FIG. 3 is a sectional view showing an overall configuration of the electric power steering apparatus according to the present invention.
Figure 4:
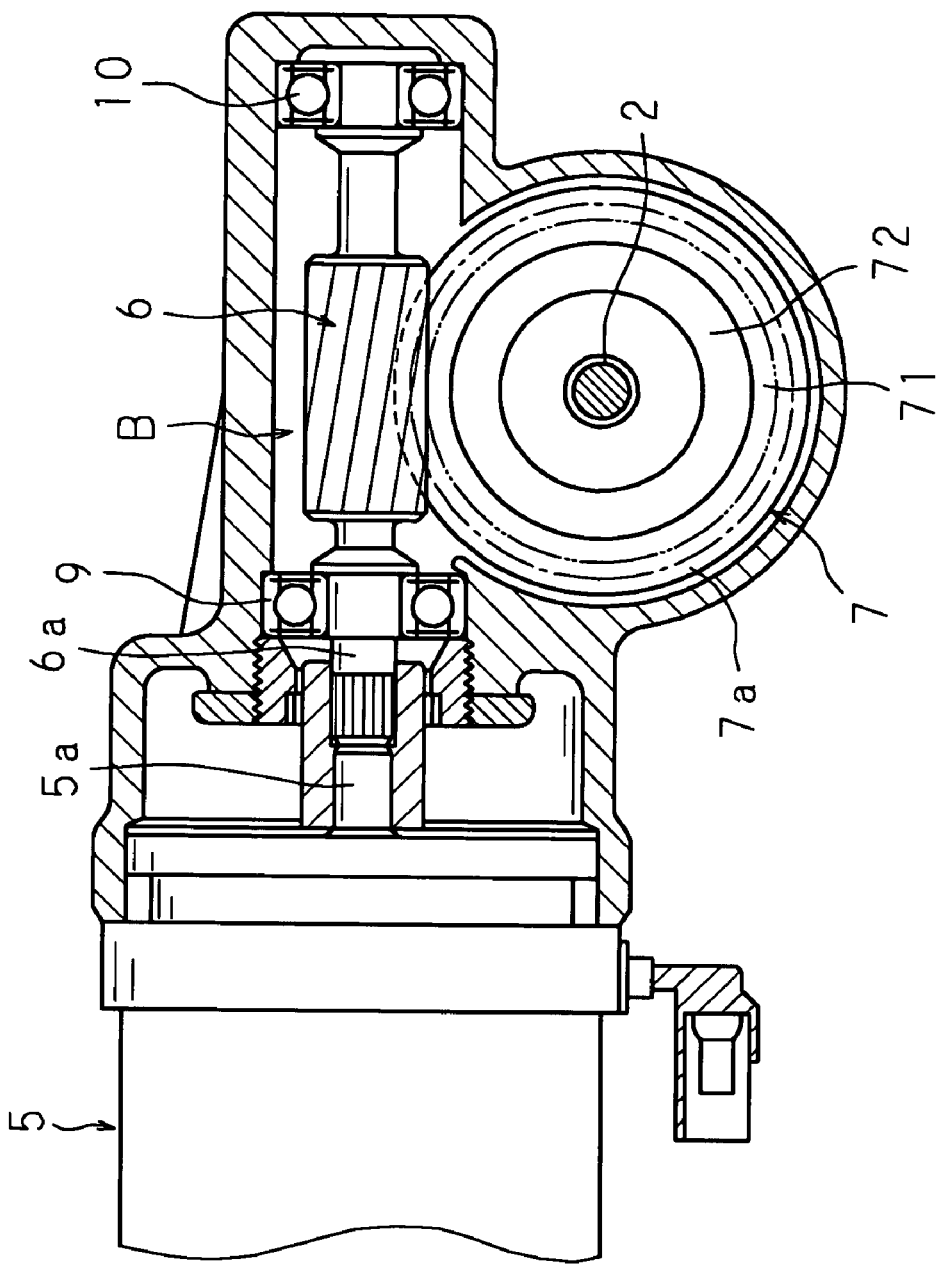
FIG. 4 is a sectional view showing a configuration of a portion of a reduction gear mechanism of the electric power steering apparatus according to the present invention.

FIG. 1 is an enlarged sectional view showing a configuration of an essential portion of an electric power steering apparatus according to the present invention, FIG. 2 is a front view showing a configuration of a worm wheel of the electric power steering apparatus according to the present invention, FIG. 3 is a sectional view showing an overall configuration of the electric power steering apparatus according to the present invention, and FIG. 4 is a sectional view showing a configuration of a portion of a reduction gear mechanism of the electric power steering apparatus according to the present invention.

The electric power steering apparatus according to the present invention is provided with: a first steering shaft 1 whose one end portion is connected with a steering wheel A for steering and other end portion has a cylindrical portion 1*a*; a torsion bar 2 which is inserted into the cylindrical portion 1*a*, and whose one end portion is coaxially coupled with the other end portion of the steering shaft 1 to be twisted by an action of the steering torque applied to the steering wheel A; a second steering shaft 3 whose one end portion is inserted around the cylindrical portion 1*a* and other end portion is coaxially coupled with the other end portion of the torsion bar 2; a torque sensor 4 for detecting a steering torque applied to the steering wheel A by a relative rotational displacement quantity of the first and second steering shafts 1 and 3 in accordance with torsion of the torsion bar 2; an electric motor 5 for assisting steering driven based on the torque detected by the torque sensor 4; a reduction gear mechanism B having a driving gear (hereinafter referred to as a worm) 6 and a driven gear (hereinafter referred to as a worm wheel) 7 to transmit the rotation of the electric motor 5 after reducing the rotation to the second steering shaft 3; and a housing 8 in which the torque sensor 4 and the reduction gear mechanism B are housed.

The reduction gear mechanism B is provided with the worm 6 made of metal arranged so as to cross an axis of the second steering shaft 3 and having a shank 6*a* connected with an output shaft 5*a* of the electric motor 5, and the worm wheel 7 meshing with the worm 6 and fitted and fixed between the worm 6 and the second steering shaft 3. By such reduction gear mechanism B, rotation of the output shaft 5*a* is transmitted to the second steering shaft 3 after reduced by meshing with the worm 6 and worm wheel 7, and further from the second steering shaft 3 to, for example, a rack and pinion type steering mechanism (not shown) via a universal joint.

The worm wheel 7 is provided with an annular teeth body 71 made of synthetic resin having, in a peripheral portion, a plurality of teeth 7*a* meshing with the worm 6, and a core body 72 made of metal coupled with an inner side of the annular teeth body 71. A through hole 72*a* bored at a central portion of the core body 72 is fitted to the second steering shaft 3. Since the worm wheel 7 is provided with the annular teeth body 71 made of synthetic resin, noise caused by meshing with the worm 6 can be reduced and, at the same time, machinability of the teeth 7*a* is improved.

On one side surface 71*a* of the annular teeth body 71 in the face width direction, protrusions 73 are integrally provided at a plurality of circumferential positions on an eccentric circle C, that is, at the plurality of circumferential positions from which the distance to a center of rotation is different from each other. In the present embodiment, eight protrusions 73 are arranged equidistantly between an inner circumferential surface and a bottom of the annular teeth body 71.

A planar shape of each protrusion 73 is an approximate trapezoid whose base on an outer side in the diameter direction of the worm wheel 7 is shorter than the base on the other side. Therefore, one surface of each protrusion 73 in the circumferential direction of the annular teeth body 71 is inclined toward one circumferential direction of the annular teeth body 71 between the inner side and outer side in the diameter direction of the annular teeth body 71. With each protrusion 73 formed in such manner, a first guide surface 73*a* is formed to guide lubricating fats and oils toward a tooth tip when the worm wheel 7 rotates in other direction. Also, the other surface of each protrusion 73 in the circumferential direction of the annular teeth body 71 is inclined toward the other circumferential direction of the annular teeth body 71 between the inner side and outer side in the diameter direction of the annular teeth body 71. With each protrusion 73 formed in such manner, a second guide surface 73*b* is formed to guide the lubricating fats and oils toward the tooth tip when the worm wheel 7 rotates in one direction. The first and second guide surfaces 73*a* and 73*b* form both side surfaces of an approximate trapezoid whose outer side in the diameter direction of the annular teeth body 71 is narrower. Each protrusion 73 is integrally molded by molding die in which a cavity corresponding to the annular teeth body 71 and protrusions 73 is provided. The molding is performed by injecting melted synthetic resin material into a cavity in which the core body 72 is housed and arranged as an insert. Therefore, each protrusion 73 is molded into a state in which each protrusion 73 is integrally coupled with the core body 72.

The core body 72 is formed from metallic material such as mild steel into a disk-like shape and a protruding ridge such as a spline is provided on an outer circumferential surface thereof. Therefore, the core body 72 is coupled with the annular teeth body 71 to prevent relative rotation and relative displacement in an axial length direction.

The housing 8 has a first housing portion 8a in which the worm 6 is housed and supported at both outer side portions by two roller bearings 9 and 10, respectively, a second housing portion 8b connected with the first housing portion 8a for housing and supporting the worm wheel 7 by supporting the second steering shaft 3 at both outer side portions by two roller bearings 11 and 12, respectively, and a third housing portion 8c connected with the second housing portion 8b for housing and supporting the torque sensor 4. An annular concave portion 8d is provided on an inner surface of the second housing portion 8b of the housing 8 facing the one side surface 71a of the annular teeth body 71. The protrusions 73 are arranged in the annular concave portion 8d.

When assembling the electric power steering apparatus constructed as described above, the lubricating fats and oils such as grease whose viscosity is relatively high are applied to the worm 6 and worm wheel 7, and further, the lubricating fats and oils are applied also to a space D (annular concave portion 8d) between the worm wheel 7 and inner surfaces of the housing 8. As the lubricating fats and oils to be applied here, grease that contains synthetic resin material whose viscosity is lower than that of general grease and has the elastic function.

In the electric power steering apparatus according to the present invention constructed as described above, a steering force of the steering wheel A is transmitted to, for example, a rack and pinion type steering mechanism via the first and second steering shafts 1 and 3 and the universal joint. At the same time, the electric motor 5 is driven in accordance with a steering torque generated by steering of the steering wheel A and rotation of the electric motor 5 is transmitted from the worm 6 and worm wheel 7 to the second steering shaft 3, so that a burden of labor of a driver for steering is reduced.

Then, when the worm 6 and worm wheel 7 rotate with rotation of the electric motor 5, since the lubricating fats and oils adhered to the worm 6 and worm wheel 7 are present between tooth surfaces of the meshing portion while moving together with the worm 6 and worm wheel 7, an oil film of lubricating fats and oils having the elastic function is generated between tooth surfaces. Since collision energy can thereby be absorbed by the elastic function of the lubricating fats and oils, noise caused by the backlash of the meshing portion of the worm 6 and worm wheel 7 can be reduced. Therefore, some dimensional errors and assembly errors of the reduction gear mechanism B can be allowed, so that manufacturing cost may be reduced.

When the worm 6 and worm wheel 7 rotate, each of the protrusions 73 protruded on the one side surface 71a of the worm wheel 7 stirs the lubricating fats and oils in the space D successively. As a result, the lubricating fats and oils in the space D can be made to adhere to the one side surface 71a of the worm wheel 7 repeatedly. The lubricating fats and oils adhered to the one side surface 71a of the worm wheel 7 moves to the tooth side of the worm wheel 7 due to a centrifugal force by the rotation of the worm wheel 7. Excessive lubricating fats and oils on the tooth side are returned to the annular concave portion 8d and further to the space D by flow friction generated between the inner surfaces of the housing 8. Therefore, the lubricating fats and oils can be made to be present between tooth surfaces for a long period of time, reducing noise caused by the backlash of the meshing portion of the worm 6 and worm wheel 7 for a long period of time.

Incidentally, protrusions 73 of the present embodiment are provided at equiangular intervals and thus the lubricating fats and oils in the space D are stirred continuously and periodically.

Also, one surface and the other surface in the circumferential direction of the protrusion 73 protruding on the one side surface 71a of the worm wheel 7 are formed as the guide surfaces 73a and 73b. Thus, when each of the protrusions 73 stirs the lubricating fats and oils in the space D successively by rotation of the worm wheel 7 in one direction, the lubricating fats and oils facing the other surface of each of the protrusions 73 can be caused to move smoothly to the tooth side along the second guide surface 73b. Conversely, when each of the protrusions 73 stirs the lubricating fats and oils in the space D successively by rotation of the worm wheel 7 in the other direction, the lubricating fats and oils facing the one surface of each of the protrusions 73 can be caused to move smoothly to the tooth side along the first guide surface 73a. Therefore, since the lubricating fats and oils can be made to be present between tooth surfaces for a still longer period of time, noise caused by the backlash of the meshing portion can be reduced for a still longer period of time.

Incidentally, in the embodiment described above, general grease containing no synthetic resin material may be used as the lubricating fats and oils, in addition to grease having the elastic function.

Also, in the embodiment described above, the protrusions 73 are provided on the one side surface 71a of the worm wheel 7. However, other configuration in which protrusions 73 are provided on both side surfaces of the worm wheel 7 or on a side surface of a face width direction of the worm 6 may be adopted. Also, a configuration in which protrusions 73 are provided only on one of the worm 6 and the worm wheel 7 may be adopted, and further a configuration in which protrusions 73 are provided on both may be adopted.

Moreover, in the embodiment described above, the worm wheel 7 having the annular teeth body 71 made of synthetic resin and the core body 72 made of metal is provided. However, another configuration in which the whole of the worm wheel 7 is made of metal may be adopted. Also, in the embodiment described above, protrusions 73 are formed integrally with the annular teeth body 71 made of synthetic resin, but another configuration in which protrusions 73 formed separately from the annular teeth body 71 are welded onto the annular teeth body 71 may be adopted.

Further, each protrusion 73 of a planar shape is formed into an approximate trapezoid, but the protrusion 73 may be formed, for example, into a wedge shape. In short, it is sufficient that both side surfaces of each protrusion 73 in the circumferential direction of the worm wheel 7 are separated with respect to a straight line passing through the center of the worm wheel 7 at the outside in the diameter direction if the worm wheel 7.

Also, in the embodiment described above, a configuration in which the reduction gear mechanism B having a driving gear which is the worm 6, and a driven gear which is the worm wheel 7 is adopted. However, as another configuration in which the reduction gear mechanism B has a spur gear, a helical gear, or a double helical gear may be adopted.

As has been described in detail, according to the present invention, a circulating quantity of the lubricating fats and oils having appropriate fluidity circulating with rotation of the driving gear and driven gear can be ensured for a long period of time. Therefore, since the lubricating fats and oils can be made to be present between tooth surfaces of the meshing portion of the driving gear and driven gear continuously for a long period of time, so that noise caused by the backlash can be reduced.

Also, according to the present invention, the lubricating fats and oils can be made to be present between tooth surfaces of the meshing portion of the driving gear and driven gear for a still longer period of time.

Further, according to the present invention, a plurality of protrusions can be formed easily and thus manufacturing cost can be made relatively lowered.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus that assists steering by transmitting a rotating force of an electric motor for assisting steering to a steering mechanism comprising:
   a housing;
   a driving gear and a driven gear meshing with said driving gear within the housing,
   wherein at least one of said driving gear and said driven gear has at least one protrusion on a side surface in a face width direction, the at least one protrusion being substantially perpendicular to the side surface, the protrusion allowing the stirring of lubrication in a space between at least one of said driving gear and driven gear and an inner face of the housing.

2. The electric power steering apparatus as set forth in claim 1, wherein said driven gear has an annular teeth body made of a synthetic resin and a metallic core body coupled with an inner side of said annular teeth body, and said protrusion is welded onto said annular teeth body or integrally molded with said annular teeth body.

3. The electric power steering apparatus as set forth in claim 1, wherein the at least one protrusion is a plurality of protrusions.

4. The power steering apparatus as set forth in claim 1, wherein the at least one protrusion extends in the direction of the gear's axis of rotation.

5. An electric power steering apparatus that assists steering by transmitting a rotating force of an electric motor for assisting steering to a steering mechanism via a driving gear and a driven gear meshing with said driving gear, wherein
   at least one of said driving gear and said driven gear has at least one protrusion on a side surface in a face width direction, wherein said protrusion has guide surfaces that are inclined toward the circumferential direction between an inner side and an outer side in a diameter direction of said driving gear or said driven gear, and guide lubricating fats and oils toward a tooth tip.

6. The electric power steering apparatus as set forth in claim 5, wherein said driven gear has an annular teeth body made of a synthetic resin and a metallic core body coupled with an inner side of said annular teeth body, and said protrusion is welded onto said annular teeth body or integrally molded with said annular teeth body.

7. The electric power steering apparatus as set forth in claim 5, wherein said guide surfaces on both sides of said protrusion are more separated on the inner side than the outer side in the diameter direction of said driving gear or said driven gear on both sides in said circumferential direction of said driving gear or said driven gear.

8. The electric power steering apparatus as set forth in claim 7, wherein said driven gear has an annular teeth body made of a synthetic resin and a metallic core body coupled with an inner side of said annular teeth body, and said protrusion is welded onto said annular teeth body or integrally molded with said annular teeth body.

9. An electric power steering apparatus that assists steering by transmitting a rotating force of an electric motor for assisting steering to a steering mechanism via a driving gear and a driven gear meshing with said driving gear, wherein
   at least one of said driving gear and said driven gear has at least one protrusion on a side surface in a face width direction, wherein a plurality of said protrusions are provided, and each of which is arranged in each of a plurality of circumferential positions of said driving gear or said driven gear with a different distance from a center of rotation of said driving gear or said driven gear from each other.

10. The electric power steering apparatus as set forth in claim 9, wherein said driven gear has an annular teeth body made of a synthetic resin and a metallic core body coupled with an inner side of said annular teeth body, and each of said protrusion is welded onto said annular teeth body or integrally molded with said annular teeth body.

11. The electric power steering apparatus as set forth in claim 9, wherein each of said protrusions has guide surfaces that are inclined toward the circumferential direction between an inner side and an outer side in a diameter direction of said driving gear or said driven gear, and guide lubricating fats and oils toward a tooth tip.

12. The electric power steering apparatus as set forth in claim 11, wherein said driven gear has an annular teeth body made of a synthetic resin and a metallic core body coupled with an inner side of said annular teeth body, and each of said protrusion is welded onto said annular teeth body or integrally molded with said annular teeth body.

13. The electric power steering apparatus as set forth in claim 11, wherein said guide surfaces on both sides of each of said protrusions are more separated on the inner side than the outer side in the diameter direction of said driving gear or said driven gear on both sides in said circumferential direction of said driving gear or said driven gear.

14. The electric power steering apparatus as set forth in claim 13, wherein said driven gear has an annular teeth body made of a synthetic resin and a metallic core body coupled with an inner side of said annular teeth body, and each of said protrusion is welded onto said annular teeth body or integrally molded with said annular teeth body.

* * * * *